United States Patent
Eberle et al.

[19]

[11] Patent Number: 6,053,221
[45] Date of Patent: Apr. 25, 2000

[54] BATTERY FILLING APPARATUS

[75] Inventors: Kelly L. Eberle, Coppell; William K. Eberle, Euless, both of Tex.

[73] Assignee: Eberle Equipment Company, Inc., Euless, Tex.

[21] Appl. No.: 09/065,477

[22] Filed: Apr. 24, 1998

[51] Int. Cl.[7] ....................................... B65B 3/04
[52] U.S. Cl. .............................. 141/179; 141/45; 141/59; 141/181; 141/324; 137/260
[58] Field of Search ................. 141/1.1, 32, 45, 141/46, 59, 116, 117, 119, 120, 126, 127, 153, 156, 157, 177–179, 181; 137/260

[56] References Cited

U.S. PATENT DOCUMENTS

| | | | |
|---|---|---|---|
| 1,799,590 | 4/1931 | Kiefer | 141/45 |
| 1,810,822 | 6/1931 | Erickson | 141/126 |
| 2,263,551 | 11/1941 | Armstrong et al. | 141/46 |
| 2,274,118 | 2/1942 | Altmayer | 141/126 |
| 2,771,101 | 11/1956 | Thompson | 141/59 |
| 2,784,748 | 3/1957 | Eichenlaub | 141/59 |
| 3,062,229 | 11/1962 | Riggs | 137/260 |
| 3,249,132 | 5/1966 | Eberle | 141/59 |
| 3,318,345 | 5/1967 | Beall, Jr. | 141/59 |
| 3,556,175 | 1/1971 | Wolf | 141/285 |
| 4,007,764 | 2/1977 | Bandemor | 141/59 |
| 4,010,780 | 3/1977 | Eberle | 141/168 |
| 4,053,002 | 10/1977 | Ludlow | 141/95 |
| 4,359,075 | 11/1982 | Eberle et al. | 141/177 |
| 5,002,100 | 3/1991 | Frederick | 141/35 |

*Primary Examiner*—J. Casimer Jacyna
*Attorney, Agent, or Firm*—Arthur F Zobal

[57] ABSTRACT

The apparatus includes a battery support for supporting a battery at a fill position, a head assembly with a plurality of heads each with an opening formed therethrough, an acid tank, a circulating conduit with a pump for circulating acid, and a valve for stopping the circulation of acid. The head assembly is moved from an upper position to a lower position for engaging the head openings with the upper cell openings of the battery. A plurality of fill conduits extend from the circulating conduit between the pump and the valve to the heads for injecting acid into the battery openings by way of the head openings. A plurality of leveling tubes extend through the head openings and beyond the lower ends of the heads for with removing excess acid by way of a plurality of leveling chambers operated together with a piston. For use with batteries that have an upper manifold and a side opening, a low pressure air injection device is employed to inject low pressure air into the upper manifold when the battery is being filled with acid.

23 Claims, 16 Drawing Sheets

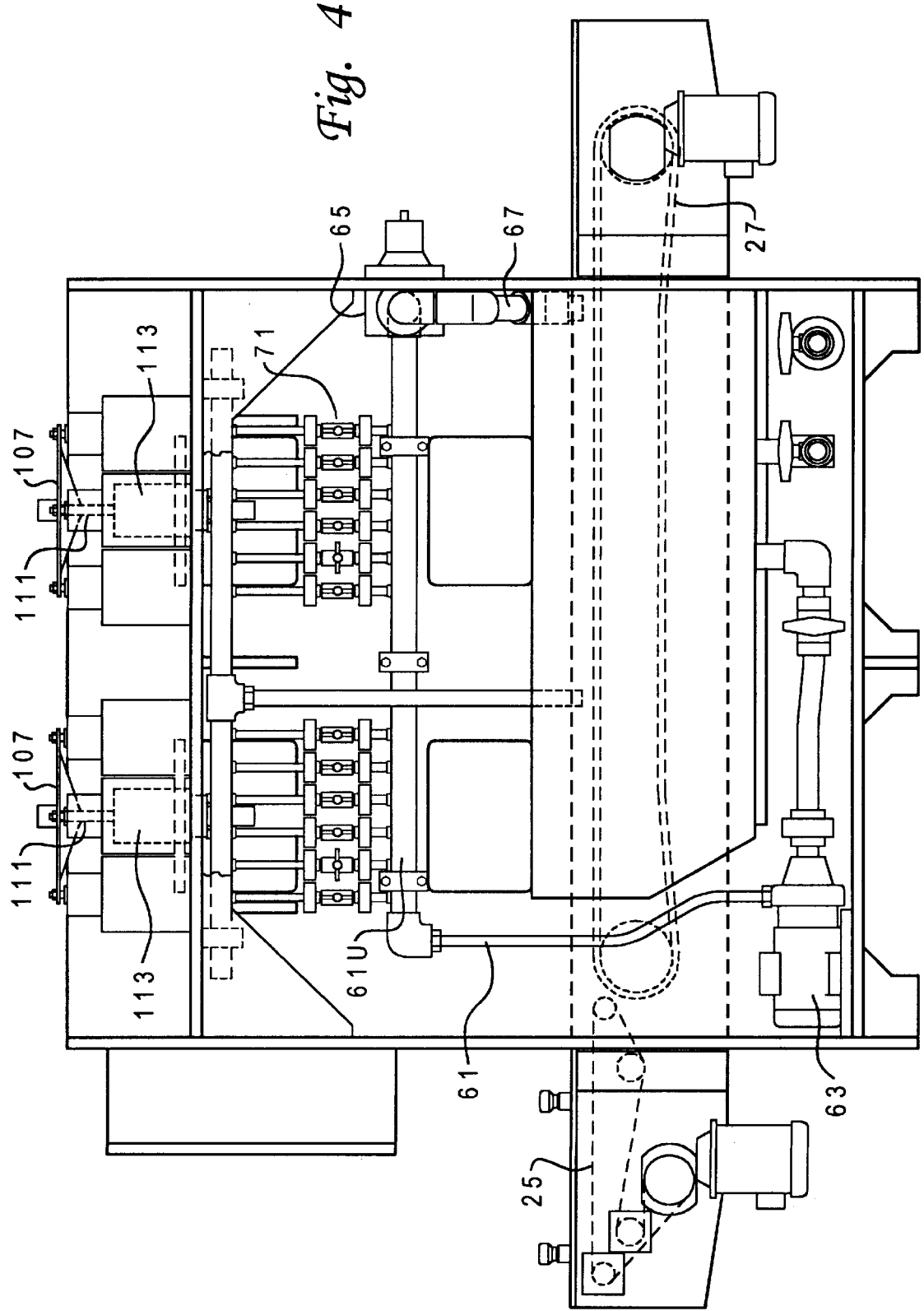

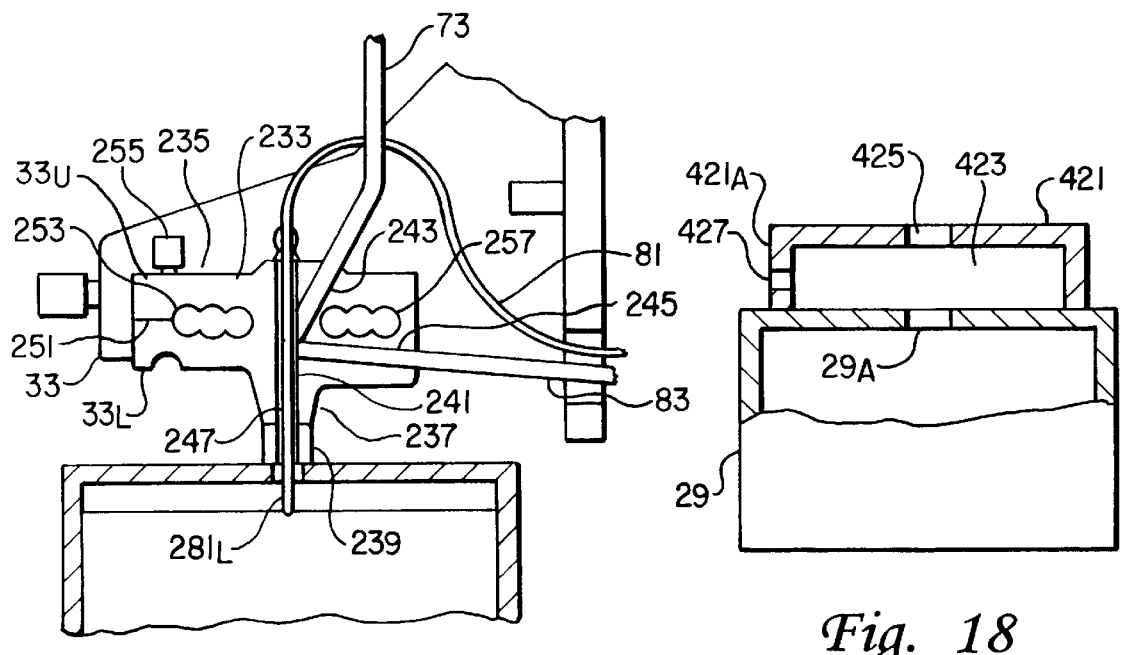
Fig. 7
Fig. 18
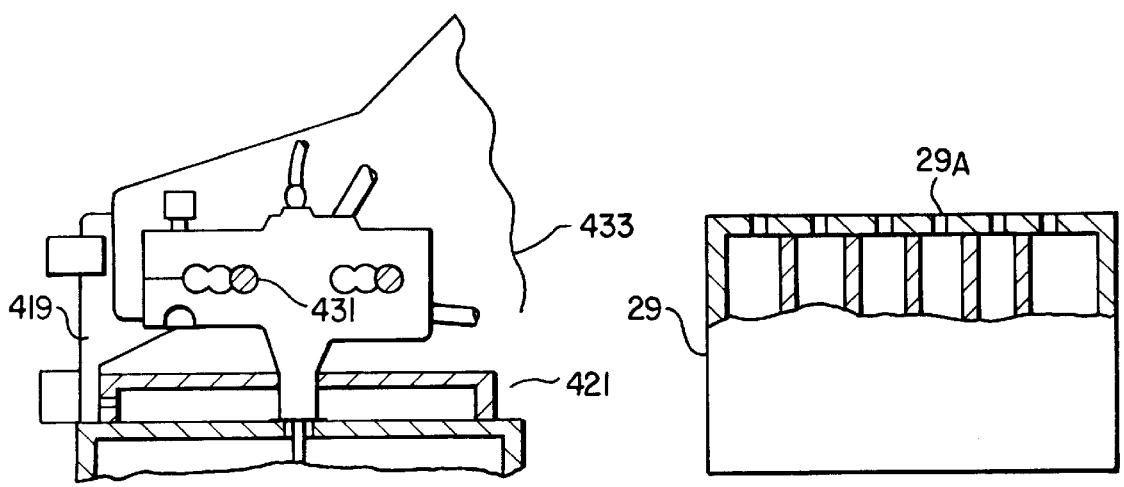
Fig. 15
Fig. 17

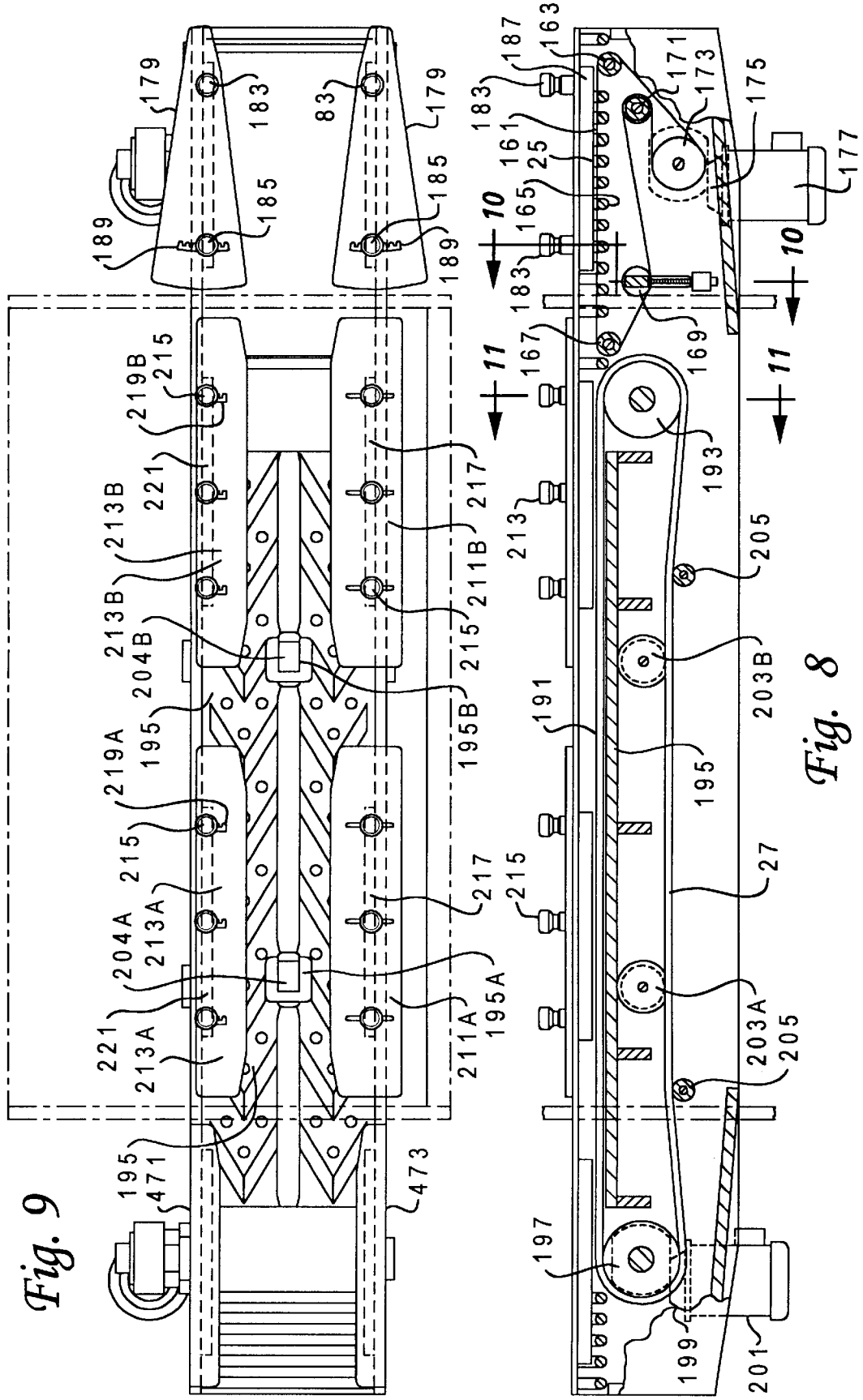

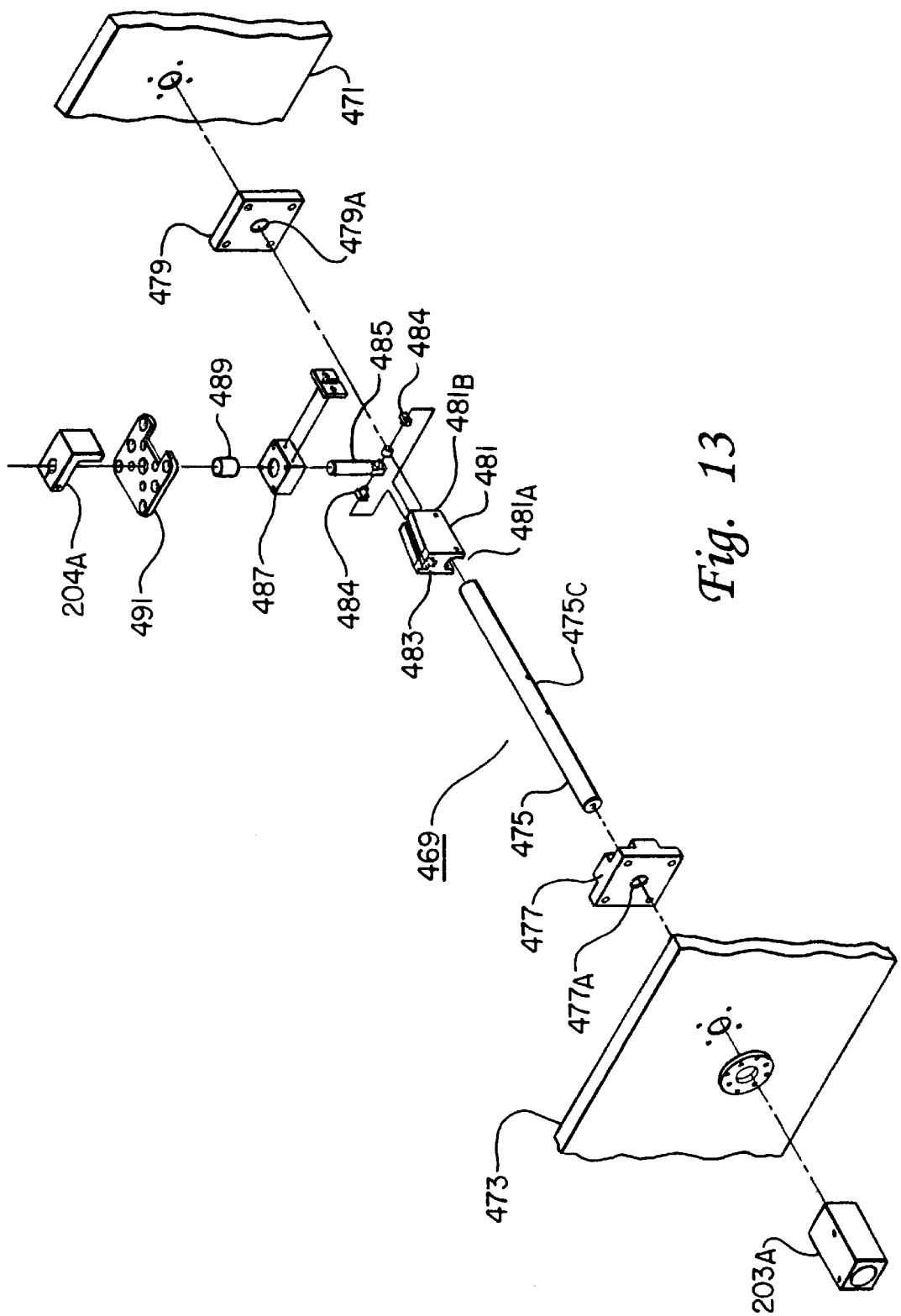

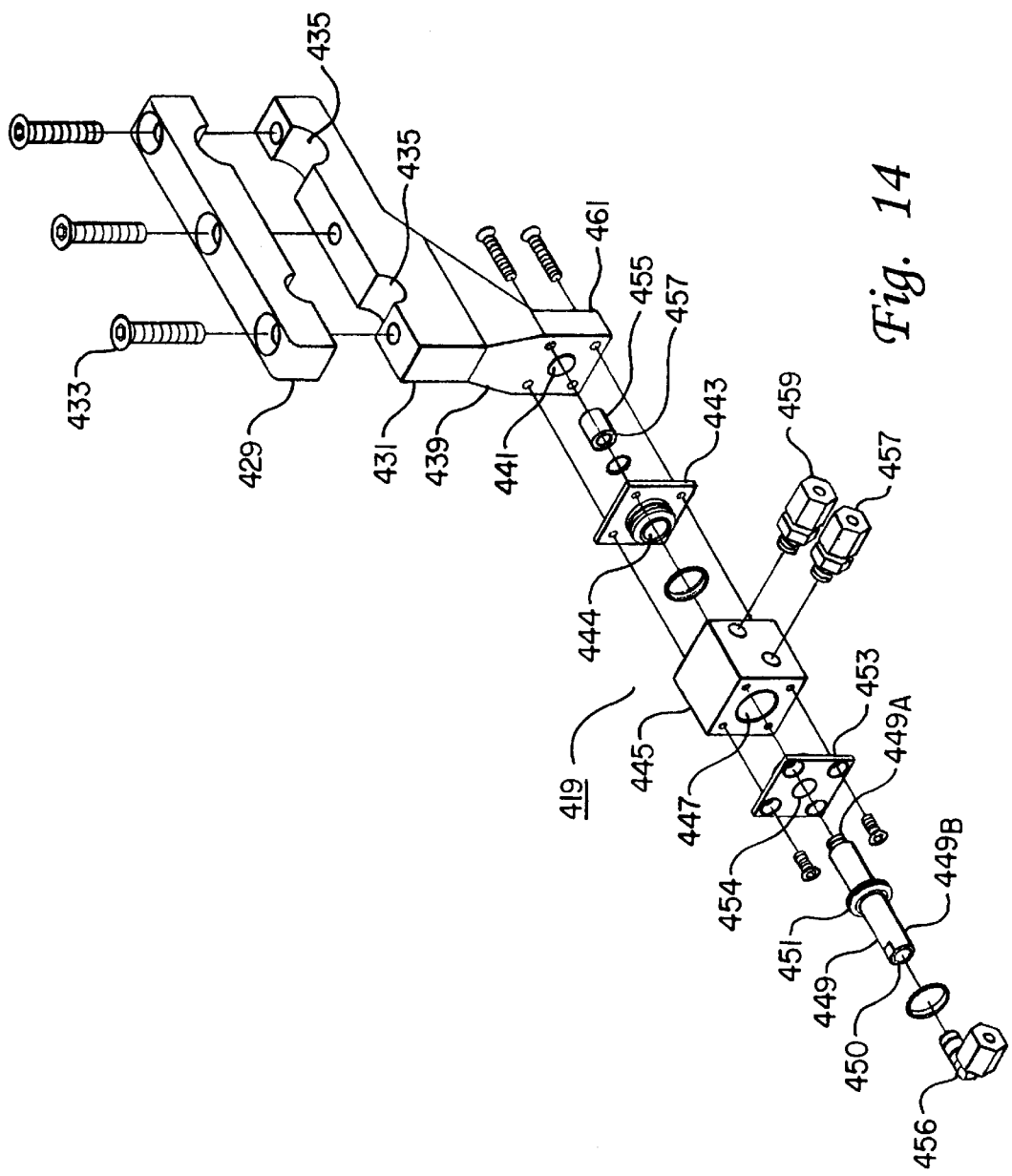

BATTERY FILLING APPARATUS

BACKGROUND OF THE INVENTION

1. Field of the Invention

The invention relates to an apparatus for filling batteries with acid.

2. Description of the Prior Art

It has long been the practice of battery filling machines to use a vacuum to build a negative pressure in the battery container and use this negative pressure to draw acid from a supply container to the cells of the battery. In most cases a vacuum pump has been employed to provide the negative pressure. This pump is used to supply the vacuum and discharges the fume laden air into the work place and with the danger of also sometimes draining acid into the pump. This pump must be supplied with as many as three jars, two of which may have a neutralizer substance to affect the pH of the liquid and to help protect the pump. This requires constant maintenance and if not watched very closely it may require frequent replacement of said pump. Other technology in modern batteries has demanded more accurate control of filling as it has become very important to put the exact amount of acid into each cell. Also stricter regulations regarding the discharge of any toxic substance have made it very necessary to neutralize any acid or reuse it in the system. It has also been a practice to either dip and tilt the battery to retain the precise fill or to fill the battery without any special attention to keeping the outside of the case clean and acid free and dry. Previous methods have also frequently required a rinse or wash step after filling. This has also been an undesirable feature since it results in contaminated water that must be treated and disposed of. In still other efforts, many plants have resorted to the use of what is termed a leveling station which is a machine that can be used to withdraw excess acid from any cell that is slightly over filled.

SUMMARY OF THE INVENTION

It is an object of the invention to provide a unique filling head which allows acid to be pumped into the battery until it is slightly over filled and which allows the excess acid to flow back to the supply tank. Precise leveling occurs with the use of a separate tube that extends down into the battery case to a precise depth and vacuum from a single stage vacuum generator siphons out the excess acid to a precise preset level. The acid removed at this point is added to the next battery to be filled during the fill portion of the cycle.

The invention comprises a battery support for supporting a battery at a fill position, a head assembly with a plurality of heads, a source for supplying acid, a plurality of fill conduits coupled from the source to the heads respectively, and a plurality of leveling tubes connected to the heads respectfully and to a plurality of pressure reducing means respectfully. A head support means is provided for supporting the head assembly and hence the heads for movement between an upper position and a lower position such that the heads and tubes may be coupled to the openings of the battery when the heads are at their lower positions. A valve is provided for controlling the flow of acid to the fill conduits. A control means is provided for controlling: the head support means for causing the heads to move from their upper positions to their lower positions to couple the heads and leveling tubes to the openings of the battery; the valve means to allow acid to flow from the source to the heads to fill the cells of the battery with acid; the pressure reducing means to remove excess acid from the battery cells; and for causing the heads to move to their upper positions after the cells of the battery are filled with acid.

In the preferred embodiment, each of the heads comprises an upper end with a lower portion extending downward to a lower end with a head opening extending through the head from its upper end to the lower end. The fill conduit is coupled to the head opening between the upper end and the lower end of the head. The leveling tube extends through the head opening from the upper end to a position below the lower end of the head. A space exists between the outside of the leveling tube and the inside wall of the head opening such that acid can flow from the fill conduit through the lower end of the head by way of the space.

In the embodiment disclosed, the pressure reducing means comprises a plurality of diaphragm cylinders operated together by a single piston.

The invention is applicable to a new design of batteries that requires a manifold to collect any gassing that may occur during charging or rapid discharging of a battery. This manifold has been designed to collect all the gases and makes it possible to discharge the gases through a tube to a point far away from the top of the battery where in previous design, sparking in the gaseous area could cause an explosion.

It becomes necessary to have a method in filling these new design batteries and avoid also filling this manifold with acid. Our invention accomplishes this by closing this opening during the fill operation and supplying a positive pressure that will prevent the entrance of acid into the manifold or if any should get in the manifold, it will blow it out into the sub area where it belongs.

BRIEF DESCRIPTION OF THE DRAWINGS

FIG. 4 is a rear view of the apparatus of FIG. 1.

FIG. 7 is an exploded view of a head.

FIG. 8 is a side view of the battery conveyor system.

FIG. 9 is a top view of the battery conveyor system.

FIG. 13 is an exploded view of a stop cylinder assembly.

FIG. 14 is an exploded view of an acid filler manifold vent.

FIG. 15 illustrates the filler manifold vent connected to the apparatus.

FIG. 17 is a cross-sectional side view of a battery.

FIG. 18 is a partial cross-sectional end view of a battery with a manifold.

DESCRIPTION OF THE PREFERRED EMBODIMENTS

Figure 1:
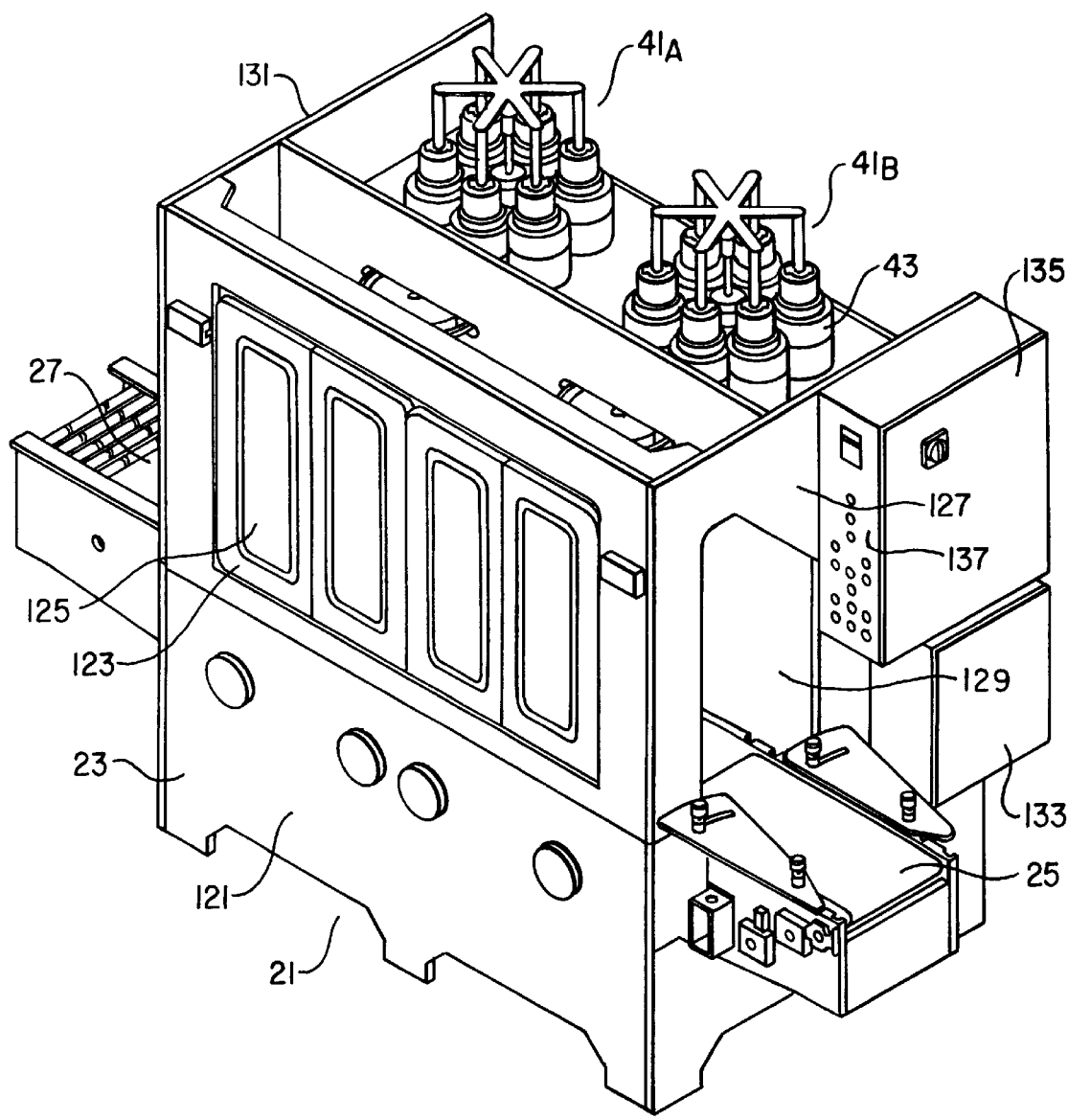
FIG. 1 is an isometric view of the apparatus of the invention.

Referring now to the drawings, the apparatus of the invention is identified at 21 in FIG. 1. It comprises a housing or frame 23 for supporting two conveyors 25 and 27 for moving two batteries 29 under and away from two head assemblies 31A and 31B, with a plurality of heads 33, an acid tank 35 (See FIG. 3) for holding acid 34, and two pairs of leveling chambers 41A and 41B. The batteries 29 are of the type that have a plurality of openings 29(A) at their upper ends leading to inner battery cells as shown in FIG. 17. In the embodiment disclosed, the batteries have six openings in a straight line and each head assembly has six heads 33 for injecting acid 34 into the six openings 29(A). Also provided is acid circulating conduit 61 (See FIG. 4) having an pump 63 and an upper valve 65 with a lower outlet 67 for moving acid from the tank 35 into the upper portion 61U of the conduit 61 for supplying acid to the six heads 33 by way of filler head valves 71 and flexible fill tubes 73. Also connected to each head 33 is a leveling tube 81 which also is connected to one of the leveling chambers 43 such that for each head assembly there are six leveling tubes 81 connected to the six heads 33 and to six of the leveling chambers 43. Connected to each of the heads 33 is a drain tube 83 which extends back to the acid tank 35.

Figure 2:
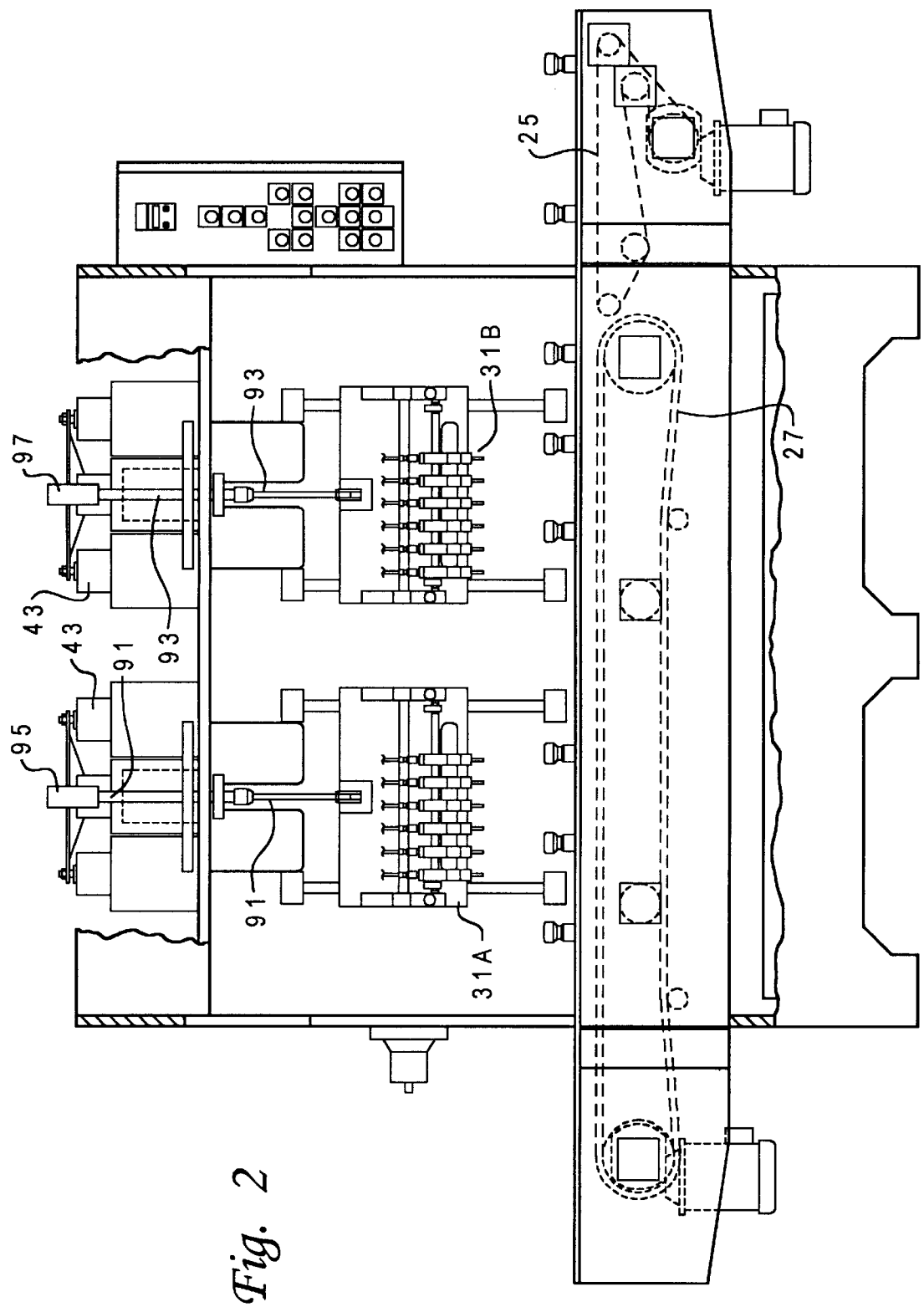
FIG. 2 is a front view of the apparatus of FIG. 1.

Connected to the head assemblies 31A and 31B are support rods 91 and 93 (See FIG. 2) which in turn are connected to the pistons of two air cylinders 95 and 97 such that the head assemblies 31A and 31B may be moved between upper and lower positions.

Figure 12:
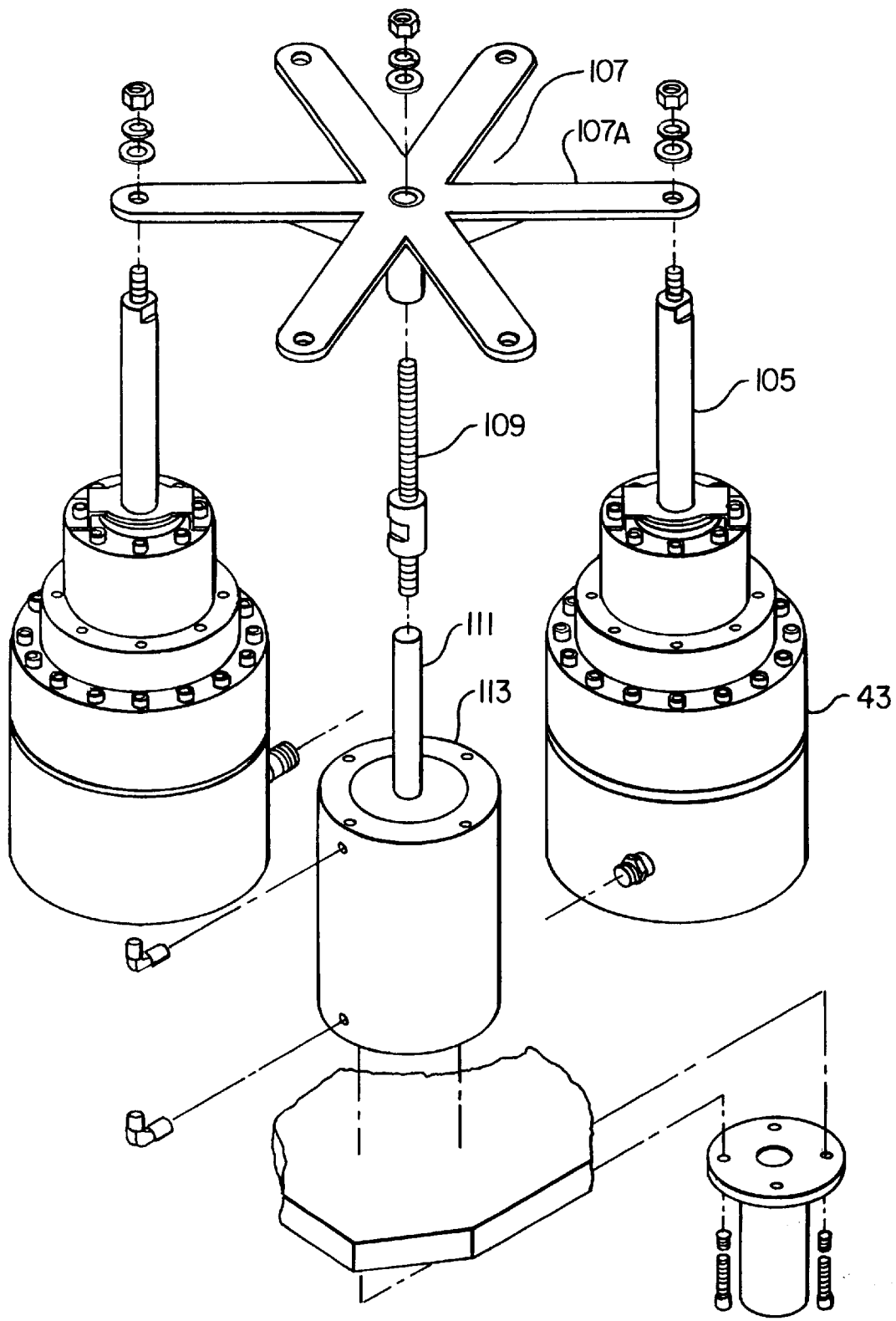
FIG. 12 is an exploded view of part of the leveling chambers of the invention.
Figure 19:
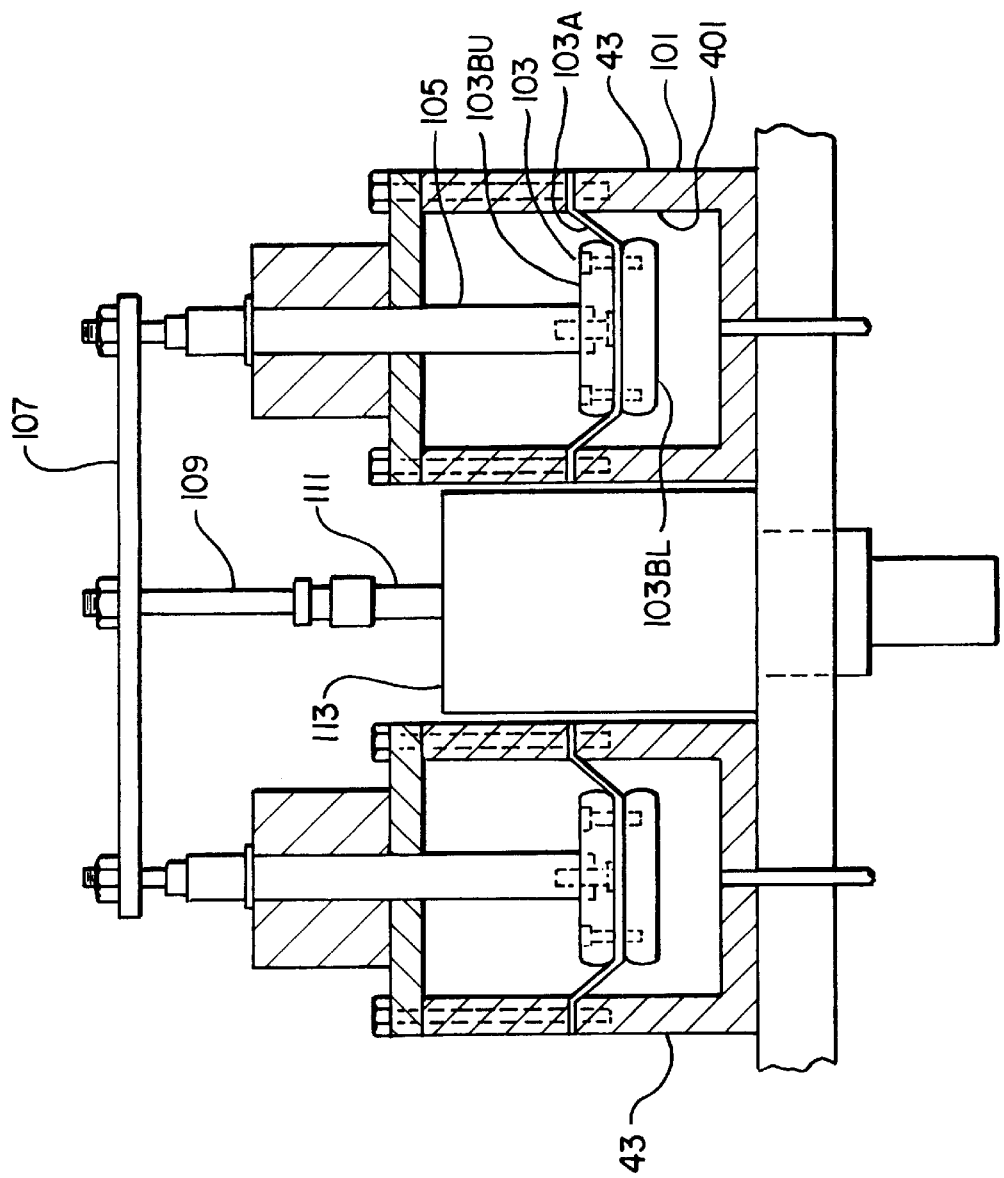
FIG. 19 is a cross-sectional view of two of the leveling chambers of the apparatus.

Referring to FIGS. 12 and 19, each of the leveling chambers 43 comprises a hollow cylindrical wall 101 with an internal diaphragm 103. A support rod 105 is connected to each diaphragm 103. Each leveling chamber assembly has an arm member 107 connected to a support rod 109. Each support rod 109 is connected to a piston 111 of an air cylinder 113 such that the piston 111 may move the arm member 107 and each arm 107A connected to a rod 105 between upper and lower position to move the diaphragms 103 between upper and lower positions.

In a given cycle, initially each of the head assemblies 31A, 31B are in their upper positions and the diaphragms 103 of the leveling chambers 43 are in their upper positions. The pump 63 is operating and the valve 65 is open such that acid circulates from the bottom of the tank, upward through the circulating conduit 61 and back into the tank. Assume that two batteries 29 are on the conveyors 25, 27 at spaced apart positions. The conveyors 25, 27 are operated to move the batteries 29 on the conveyor 27 to fill positions below the head assemblies 31A and 31B. The air cylinders 95 and 97 are operated to move the head assemblies 31A and 31B downward to couple the heads to the openings of each battery. The diaphragms 103 of the chambers 43 move down to discharge an acid in the leveling tubes 81 into the openings of the batteries. The valve 65 is closed such that acid in the conduit 61 flows into the openings of the batteries by way of the head valves 71 and fill tubes 73. The valve 65 then opens and the air cylinders 113 are actuated to move the diaphragms 103 upward to reduce the pressure in the cylinders 101 below the diaphragms and draw excess acid from the openings of the battery by way of the leveling tubes 81.

The air cylinders 95 and 97 are actuated to move the head assemblies to their upward positions. The conveyors 25, 27 then are actuated to move the two filled batteries away from the two fill positions and two unfilled batteries to the fill positions below the two head assemblies and the cycle is repeated. When the heads are coupled to the openings of the batteries the leveling chamber diaphragms 103 move downward and any excess acid in the siphon tubes 81 flow into the openings of the unfilled batteries.

More details of the apparatus now will be described. Referring to FIG. 1, the frame 21 comprises a front wall 121 with doors 123 having windows 125 for protection and observation purposes. The frame 21 has a forward wall 127 with an opening 129 for the conveyor 25 and a rear wall 131 with an opening (not shown) for the conveyor 27. The frame 21 including the walls 121, 127, 131, and doors 123 and the tank 35 are made of a suitable plastic such as PVC which is easy to construct and clean and is acid resistant.

Figure 16A:
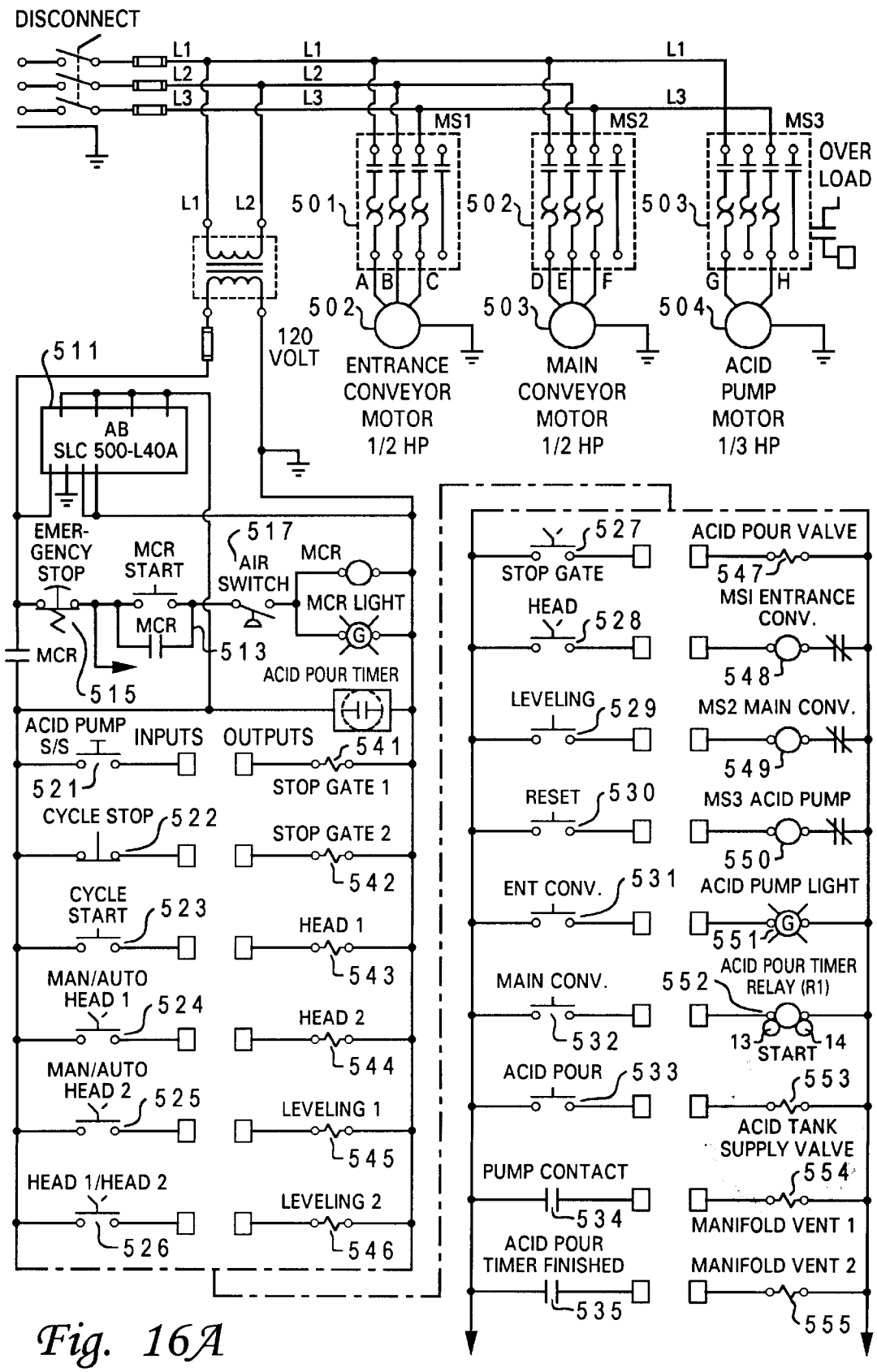
FIGS. 16A and 16B are an electrical schematic of the control system of the invention. The lower arrows of FIG. 16A connect with the upper arrows of FIG. 16B.
Figure 16B:
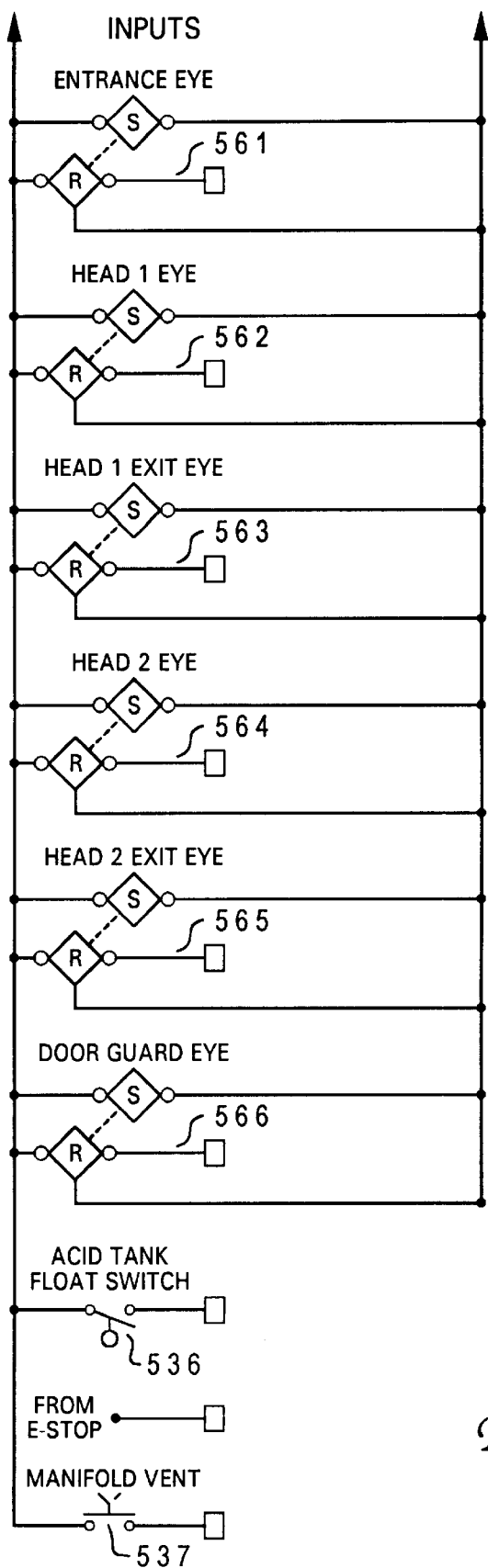

Members 133 and 135 are instrument boxes. Box 135 has an instrument panel 137 with control switches thereon as described in connection with FIGS. 16A and 16B.

Referring to FIGS. 8–11, the conveyor 25 comprises a flexible continuous member 161 which is moved counter-clockwise as shown in FIG. 8 around roller 163, over rods 165, around rollers 167, 169, 171 and 173 the latter of which is rotated by a gear box and pulley 175 and a motor 177. Members 179 and 181 are guides for guiding a battery placed on the member 161. The guides are adjustably secured in place by pins or clamps 183 and 185 which extend through apertures formed through the guides and into structure 187 of the frame. Each guide 179 is fan shaped and has teeth shaped openings 189 formed through the wider end for receiving the shaft of a pin 185 to allow the space between the guides 179 to be increased or decreased.

The conveyor 27 comprises two spaced apart flexible continuous chain members 191 (not shown in FIG. 9) which are moved counter-clockwise as shown in FIG. 8, around roller 193 over plate member 195, and around roller 197 which is rotated by a gear and sprocket 199 and a motor 201. Members 203A and 203B are solenoid valves and members 205 are tensioning rollers. Both of the conveyors 191 are not shown in FIG. 8. The two conveyors are strong enough to move and support two batteries for transport to two fill positions below the head assemblies 31A and 31B and when the batteries are filled with acid, to transport the batteries away from the fill positions. Member 211A, 211B, 213A, 213B are guides for guiding the batteries on the conveyor members 191. The guides are secured in place by pins or clamps 215. The guides 211A and 211B have three round holes for receiving the pins 215 which are screwed into members 217 supported by the frame. The guides 213A, 213B have teeth shaped openings 219A and 219B for receiving the pins or clamps 215 to allow the guides 213A and 213B to be adjustably secured to support members 221 at different positions spaced away from guides 211A and 211B.

In using the conveyors 25 and 27, a battery is placed on conveyor 25 from an upstream conveyor which moves the battery onto conveyor 27. Conveyor 27 moves the battery to the left as shown in FIGS. 8 and 9 until it is stopped by stop gate 204A when in a raised position. A second battery is moved onto conveyor 25 which moves the battery onto conveyor 27 which moves the battery until it is stopped by stop gate 204B when in a raised position and the conveyor 27 stops while the batteries are being filled with acid.

Figure 3:
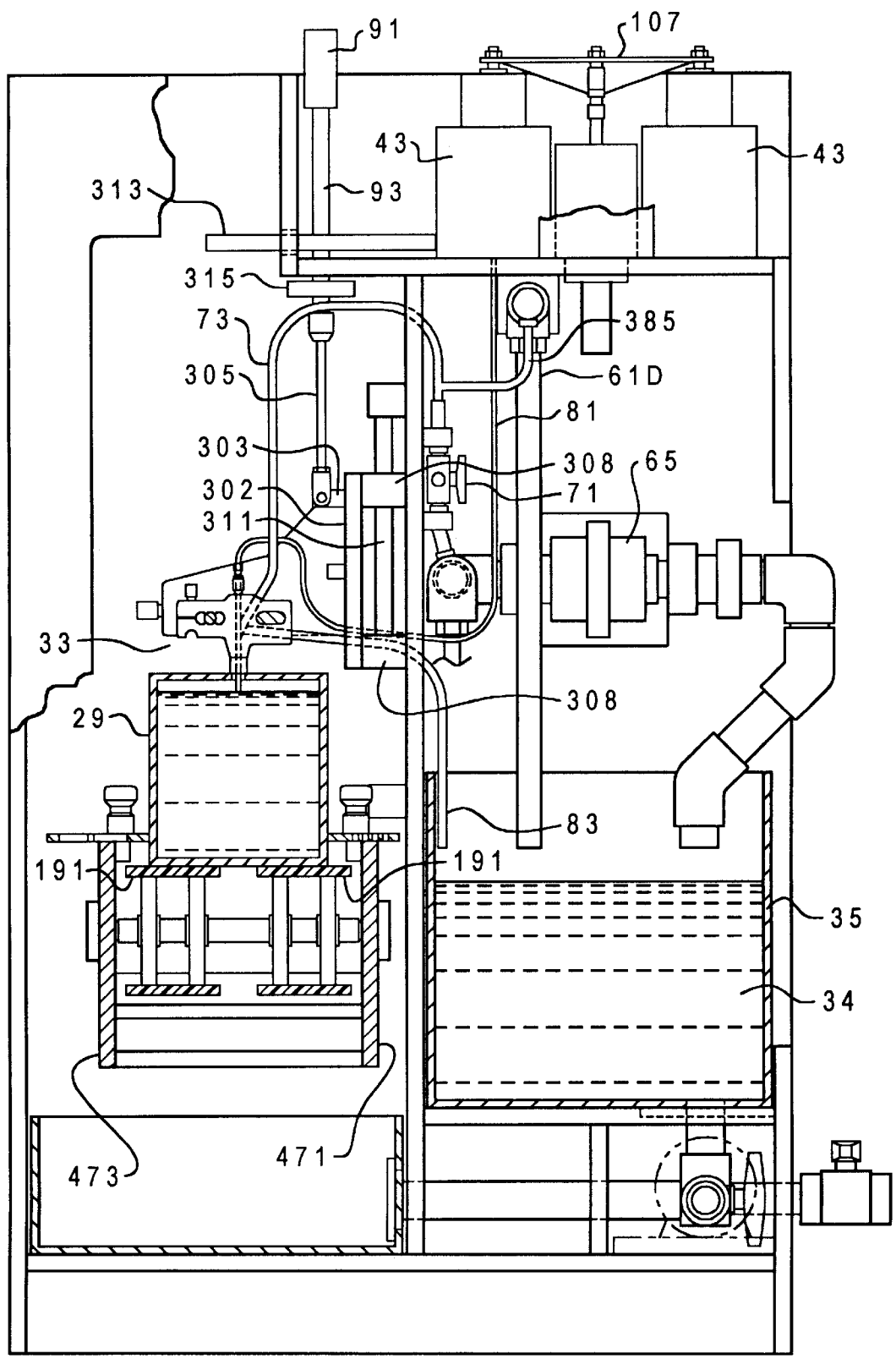
FIG. 3 is an end side view of the apparatus of FIG. 1 showing a single head.
Figure 5A:
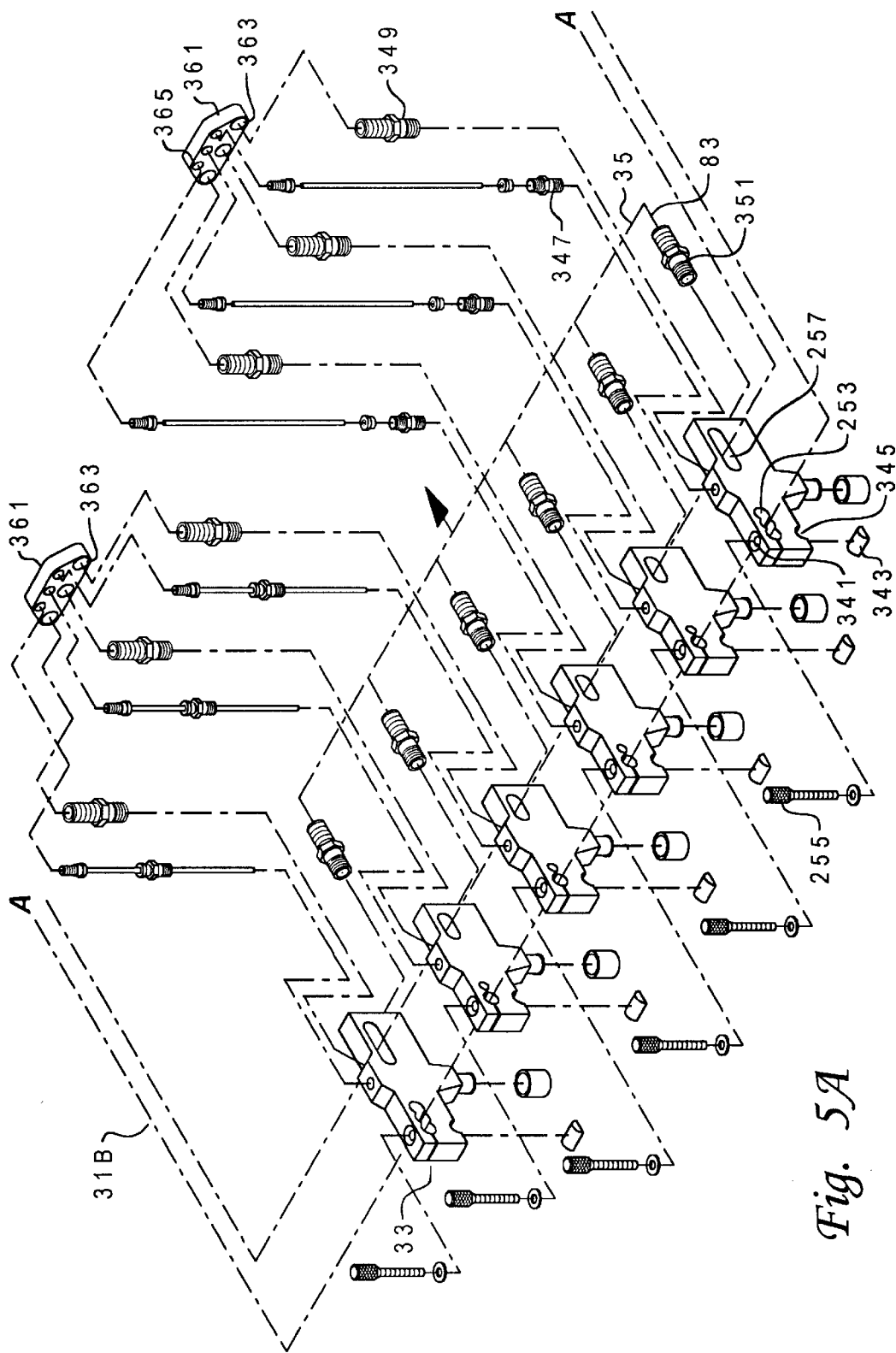
FIGS. 5A and 5B are exploded views of the head assembly of the apparatus of FIG. 1. The dotted lines A of FIG. 5A connect with the dotted lines B of FIG. 5B.
Figure 5B:
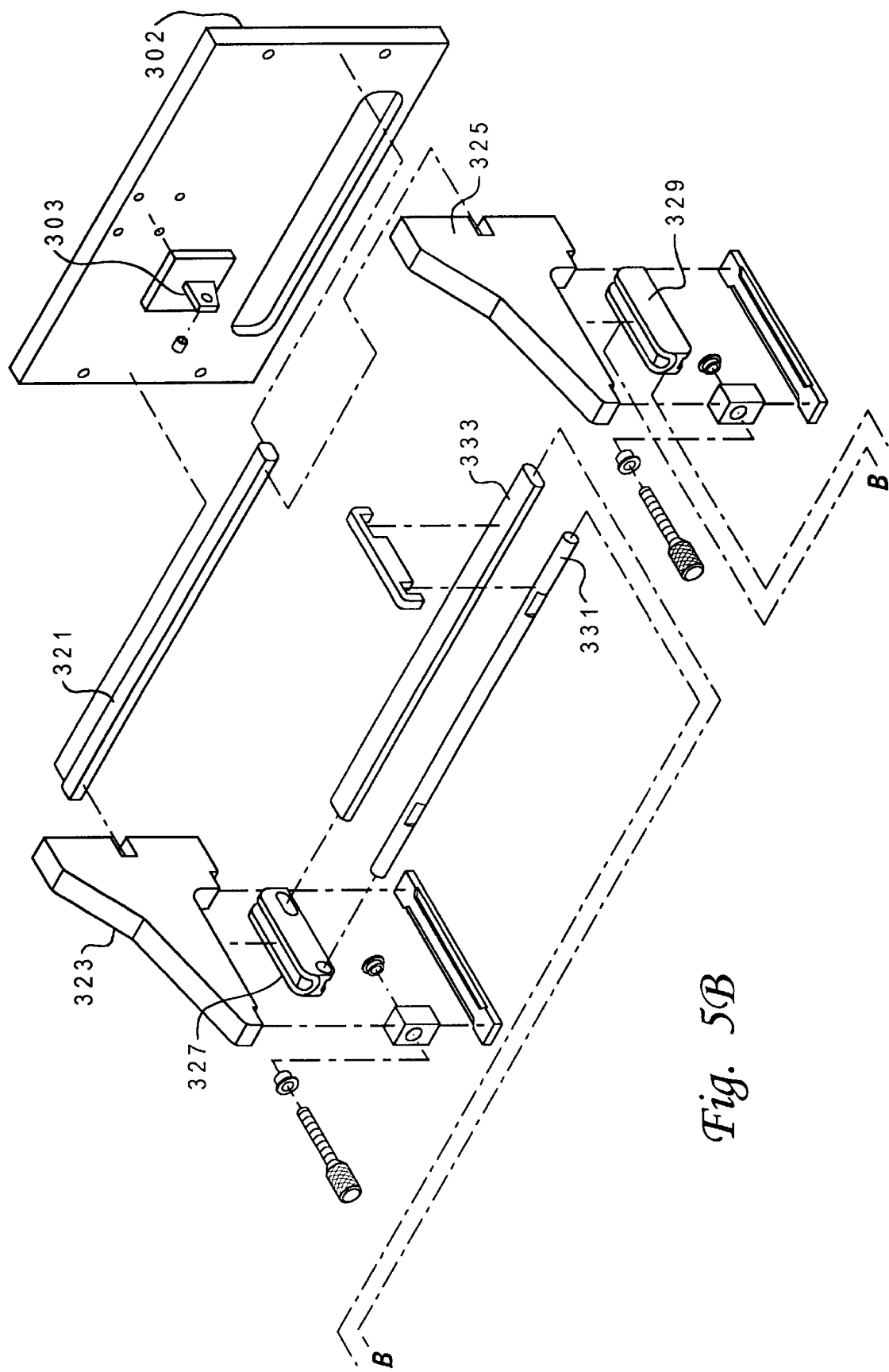

Referring now to FIGS. 3, 5, and 7, there will be described the heads 33 and one of the head assemblies 31A. All of the heads 33 are the same and the two head assemblies 31A and 31B are the same. Referring first to FIG. 7 the head shown comprises a metal member 233 having an upper end 235 and a lower pointed end 237 with a ring 239 secured to its lower end. A vertical aperture 241 extends through the head from its upper end 235 to the lower end 237. Two side apertures 243 and 245 extend into the head 33 and intersect the vertical aperture 241 at angles of about 20 degrees and 100 degrees respectively. The leveling tube 81 extends through the vertical aperture 241 with its lower end 81L extending downward beyond the lower end of the ring 239.

When the head 33 is lowered, the ring 239 surrounds an opening of the battery and the lower end 81L of the leveling tube enters the opening 29A of the battery. The lower end 81L of the tube determines the final acid level in the cell of the battery. The battery fill tube 73 is coupled to the aperture 243 as will be described in connection with FIG. 5. The vent tube 83 is coupled to the aperture 245 as will be described in connection with FIG. 5. A space 247 exists between the outside of the leveling tube 81 and the inside wall of the vertical aperture 241 such that acid injected through the fill tube flows in the space 247 into the battery cell. During the leveling stage of the process, any excess acid is drawn through the tube 81 until the level of the acid in the battery cell reaches the lower end 81L of the tube 81.

Referring also to FIG. 5, the head 33 has a gap 251 at its front end leading to a plurality of holes 253 for receiving a support rod 331 to support the head 33 at different lateral positions for adjustment purposes depending on the type of battery being filled. Member 255 is a screw clamp for clamping the split sections 33U and 33L to the support rod 331. Holes 257 also receive a support 333 as shown in FIG. 5.

Referring to FIGS. 3 and 5, member 302 is a plate having a coupling member 303 attached to its front side to which pivotally coupled a rod 305 which in turn is coupled to the piston rod 93 of the air cylinder 97. The back of the plate 302 has members 308 connected thereto with apertures through which rods 311 extend to allow the plate 302 to move upward and downward. The rods 311 are connected to structure of the frame of the apparatus. Stops 313 and 315 are connected to the piston rod 93 for limiting downward and upward movement of the rod 93 and hence the plate 302. The upper and lower stops engage the upper and lower sides respectively of structure of the frame to limit downward and upward movement of the piston rod 93.

Attached to the front side of the plate 302 is an elongated member 321 (See FIG. 5) to which two arms 323 and 325 are attached. Attached to the lower forward edges of the arms 323 and 325 are support members 327 and 329 to which are attached the two rods 331 and 333 which extend through the apertures 253 and 257 of the heads 33 and support them as an assembly. Spacers (not shown) are supported by the rods 331 and 333 between adjacent heads 33 to space them apart.

Referring to the right head 33 in FIG. 5, the clamp bolt 255 extends through an aperture 341 formed through the front portions 33U and 33L and is screwed in a half cylindrical nut 343 which fits in a slot 345 at the lower end of portion 33L. Inserted into the vertical opening 241 at the top of the head 33 is a hollow threaded member 347 for receiving the leveling tube 81. Inserted into the hole 243 of the head 33 is a hollow threaded member 349 for receiving the fill tube 73. Inserted into the hole 245 of the head 33 is a hollow threaded member 351 for receiving the vent tube 83.

Secured to structure of the frame of the apparatus are a pair of guide 361 each having three lower apertures 363 for receiving three fill tubes 73 and three upper apertures 365 for receiving three leveling tubes 81. The six vent tubes 83 are illustrated in FIG. 5 by lines which all extend to the acid tank depicted by line 35 in FIG. 5.

Figure 6:
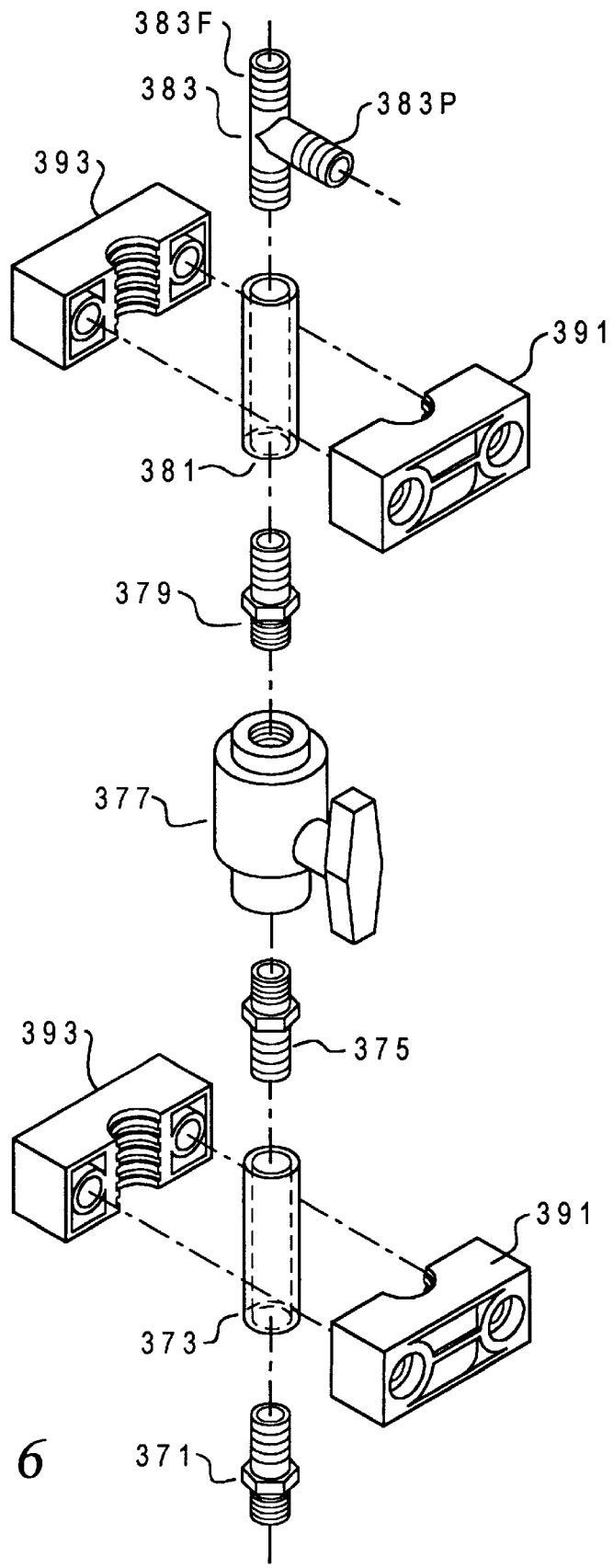
FIG. 6 is a side view of a single head valve of the invention for connecting an acid fill tube to the acid recirculating conduit.
Figure 10:
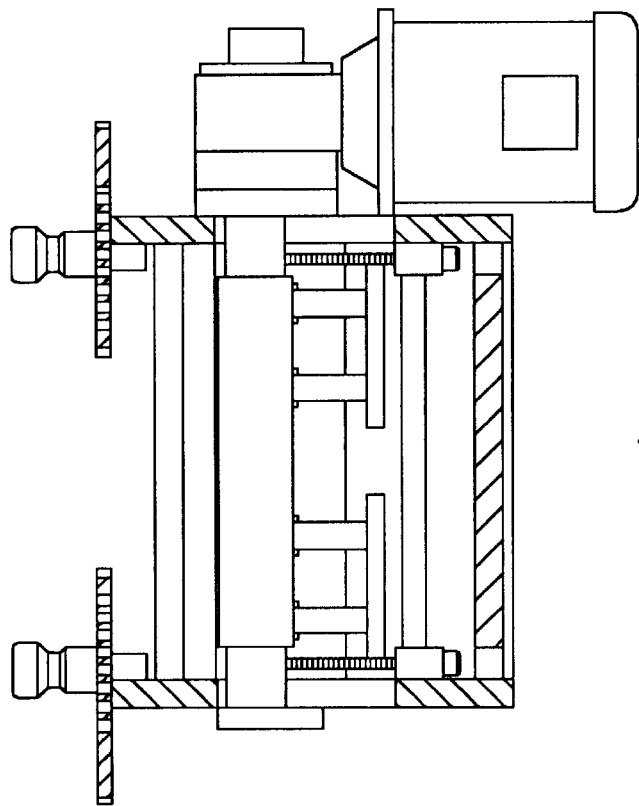
FIG. 10 is a view of FIG. 8 taken along the lines 10—10 thereof.
Figure 11:
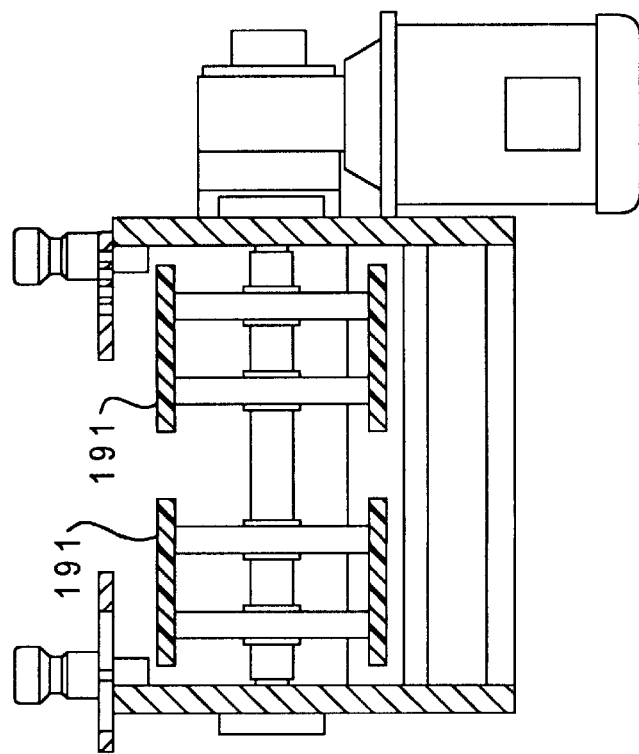
FIG. 11 is a view of FIG. 8 taken along the lines 11—11 thereof.

Each of the fill tubes are coupled to a head valve 71 each of which is coupled to the upper portion of the circulating conduit 61U. Referring to FIG. 6, each of the head valves 71 comprises a lower fitting 371 screwed into the conduit 61U and into a tubular member 373. A fitting 375 is screwed into the upper end of the tubular member 373. The upper end of the fitting 375 is screwed into a tubular portion of a valve 377. A fitting 379 is screwed into the upper end of the tubular portion of the valve 377 and into the lower end of a tubular member 381. A T-shaped fitting 383 is screwed into the upper end of the tubular member 381. A fill tube 73 is coupled to the end 383F of the member 381 and a pressure relief tube 385 is coupled to the end 383P of the member 383. See FIG. 3. Each of the fill tubes 73 has a pressure relief tube 385 coupled to the tube portion 61D.

Members 391 and 393 are clamps which are screwed together around tubular members 373 and 381 and to structure of the frame of the apparatus to secure the head valves in place.

Referring to FIGS. 1, 3, 12, and 19 the diaphragms 103 of the leveling chambers 43 each comprise a flexible diaphragm member 103A connected to the side wall 401 of the chamber 43. Rigid annular members 103BU and 103BL are connected between the member 103A and the rod 105 is connected to the member 103BU. When the diaphragm 103 is moved upward by the rod 105, the pressure is decreased in the space in the chamber 43 below the diaphragm which draws acid in the tube 81 upward. The acid remains in the tube 81 until the diaphragm is moved downward by the rod 105. The two air chambers 113 work together to operate the leveling chamber 43 together to draw acid into their tubes 81 and to force acid out of their tubes 81.

Referring now to FIG. 14, there will be described a manifold apparatus 419 that is coupled to each of the head assemblies in the event that the battery being filled is of the type shown in FIG. 18. This battery may have six in-line openings 29A as shown in FIG. 17. FIG. 18 is an end view of the battery. It has a manifold 421 defining an upper chamber 423 with all of the openings 29A exposed to the chamber. Upper openings 425 are formed in the manifold 421 in-line with the openings 29A. A side openings 427 is formed in the wall 421A of the manifold 421 for use for discharging the gas collected in the manifold during normal use. The apparatus 419 has upper and lower members 429 and 431 which are secured together by bolts 433 to form two openings 435 and 437 for receiving the rods 331 and 333 of the head assembly such that the apparatus 419 may be coupled to the rods 331 and 333 as shown in FIG. 15. The lower member 431 has a lower plate 439 with an opening 441 formed therethrough. Attached to the plate 439 are a plate 443 with an opening 444, a cylinder 445 with a cylindrical opening 447 formed therethrough for receiving a tubular piston 449, having an opening 450 formed therethrough, and a plate 453 with an opening 454 formed therethrough. An outer ring and seal 451 are secured to the piston 449. A flexible tubular member 455 with an opening 457 formed therethrough is attached to the end 449A of the piston 449 and is adapted to slide in opening 441. A coupling member 456 is attached to the end 449B of the piston 449 for injecting low pressure air of about two psi through the piston 449 and member 455. Air fittings 457 and 459 are attached to the cylinder 445 in communication with the opening 447 for injecting air into the opening 447 for moving the piston 449 and hence the member 455 in opposite directions. When the members 429 and 431 are secured to the rods 321 and 331, the side 461 of the plate 439 engages the wall 421A of the manifold 421 such that the opening 441 is in alignment with the opening 427 of the battery. When air is injected through fitting 457, the piston 449 and hence the flexible member 455 is moved against the manifold wall 421A such that low pressure air can be injected into the manifold 421 by way of coupling 456, piston 449 and tubular member 455 to prevent acid from entering the manifold 421 while the battery is being filled with acid. After the battery is filled with acid, the injection of air through fitting 457 is terminated and air is injected into the opening 447 through fitting 459 to move the piston 449 and hence the tubular member 455 away from the manifold 421.

Referring now to FIG. 13, there will be described a stop cylinder assembly 469 for operating stop gate 204A. A similar assembly will be employed for operating the stop gate 204B. The assembly is attached to lower walls 471 and 473 of the frame which supports the plate 195 (See FIG. 9) the plate 195 has two openings 195A and 195B through which the stop gates 204A and 204B may be raised or lowered. The assembly 469 comprises a cylinder 203A for moving a shaft 475 in a retracted or extended position. The end of the shaft 475 slides in openings 477A of plate 477 and 479A of plate 479 attached to the walls 473 and 471. Attached to the central portion 475C of the shaft 475 is a taper member 481 having a T-slot 483 which tapers downward from end 481A end 481B. Two T-members 484 are connected to opposite sides of the lower end of a vertical shaft 485 which extends through bearing members 487 and 489 and plate 491 which are connected to structure of the frame. The upper end of the shaft 485 is connected to the stop 204A. When the shaft 475 is in its normal retracted position, the lower end of the taper member 481 is below the shaft 481. When the shaft 475 is extended, it moves to the right as shown in FIG. 13 such that the upper end of the taper member 481 moves under the shaft 485 with the T-members 484 and the lower end of the shaft 485 sliding in the T-slot 483 to push the shaft 485 and hence the stop 204A in an upper position. When the shaft 475 is retracted, the T-members 484 pull the shaft 485 and hence the stop 204A downward.

Referring now to FIG. 16, there will be described the control system of the apparatus. Members 501, 503, and 505 are motor starters for starting the entrance conveyor motor 502, the main conveyor motor 504 and the acid pump motor 506 respectively. Member 511 is a programmable controller, which includes four internal timers TD1, TD2, TD4 and TD5. It also controls an external timer TD3 which is adjustable. Member 513 is a master control relay which controls the complete system. Member 515 is an emergency switch. Member 517 is a manual air switch. Members 521, 522, 523, 524, 525, 526, 527, 528, 529, 530, 531, 532, 533, 536, and 537 are manual switches which are connected to the input of the control 511 for manually controlling certain components of the apparatus. Members 534 and 535 are contacts controlled by the controller 511. Members 541, 542, 543, 544, 545, 546, 547, 548, 549, 550, 551, 552, 553, 554, 555 are coupled to the output of the controller 511. Members 541–547 and 533–555 control electrical pneumatic solenoids. Members 561, 562, 563, 564, 565, and 566 are electric eyes.

Switch 521 is a manual acid pump start and stop switch; switch 522 is a manual cycle stop switch; switch 523 is a manual cycle start switch; switches 524 and 525 represent selector switches for automatic or a manual control of heads 1(31A) and 2(31B). The switch 526 represents a selector switch for manually controlling head 1(31A) or head 2(31B). For example if manual is selected by switch 524 and if head 1(31A) is selected by switch 526, the "manual" switches 527, 528, 529 control, the stop gate, the upward and downward movement and the leveling of head 1. If head 2(31B) is selected, the manual switches 527, 528, 529 control the stop gate, the upward and downward movement and the leveling of head 2. If automatic is selected by switch 524, the apparatus is operated automatically. The reset switch 530 is used to reset any timers or counters. Switches 531 and 532 can be used to manually control the entrance and main conveyors. Switch 533 can be used to manually control the acid pour valve 65. Contacts 534 are pump contacts which closes to let the controller know that the pump is running. When the timer of the controller in the automatic mode times out, contacts 535 close to send a signal to the controller to inform the controller that it has timed out. Switch 536 is a float switch in the acid tank that controls the level of the acid in the tank to insure that acid always is in the tank. Switch 537 can be used to manually control the manifold vent.

Members 541 and 542 represents the solenoids of stop gates 1(204A) and 2(204B). Members 543 and 544 represent the solenoids of the cylinders of head 1(31A) and head 2(31B) to move them up or down. Normally the heads are up. When their solenoids are energized the heads go down. When their solenoids are de-energized, their heads go up. Members 545 and 546 represent the solenoids of the air cylinders of the leveling chambers 1(41A) and 2(41B). Normally the diaphragms of the leveling chambers are in the up position. When their solenoids are energized they are moved down. When their solenoids are de-energized they are moved back up. Member 547 represent the solenoid of the acid pour valve 65. Members 548 and 549 represent the coils of the motors 502 and 503 of the entrance and main conveyors. Member 350 represents the coil of the acid pump 63. Member 551 represents an acid pump light which is employed to let the operator know that the acid pump is running. Member 552 represents the relay of the acid pour timer (the external timer TD3) that provides a signal from the controller to start the timer. When the timer times out, it closes the contracts 535 and informs the controller that the timer has timed out. Member 553 represents the solenoid of an external acid supply tank valve which controls the level of the acid in the acid tank to insure that the proper level is maintained. Members 554 and 555 represent the solenoids of the acid filler manifold vents 419 that control air flow to the cylinders 445 to control the positions of their pistons 449 and air flow through the pistons 449.

In the electric eyes 561–566, S represents a source and R represents a receiver. As the batteries cross the entrance conveyor, they pass the entrance eye 561 which controls a counter in the controller that counts the batteries coming into the apparatus. After the count of 2 is reached, the entrance conveyor stops. The head 1(31A) eye 562 and head 1(31A) exit eye 563 control the batteries at head 1(31A). Head 1 eye lets the controller know that the battery has stopped at head 1 and it is ready to be filled and the head 1 exit eye lets the controller know that a battery has left head 1 and it is ready to receive another battery. The head 2(31B) eye 564 is positioned such that when a battery stops at head 2, it lets the controller know that it is ready to be filled and when the filled battery is exiting, head 2 is releases the head 2 exit eye 565. The batteries are stopped when the stop gates come up and prevent further travel of the batteries on the main conveyor. When both batteries are stopped by the two stop gates, the main conveyor stops. When both head 1 and head 2 eyes are blocked by the two batteries, the controller is signaled to stop the main conveyor and start the cycle for filling. The door guard eye 566 informs the controller if any of the doors 125 are opened to stop acid from being pumped and circulated.

The sequence for the automatic cycle now will be described. In this application heads 2 and 1 refer to heads 31B and 31A respectively; stop gates 2 and 1 refer to stop gates 204B and 204A respectively; head 1 eye and head 1 exit are used in connection with head 1 and head 2 eye and head 2 exit eye are used in connection with head 2. From the entrance conveyor 25, head 1 is downstream from head 2. At the beginning of the automatic cycle, certain conditions exist. The heads are in the up positions; the stop gates are down; the leveling chambers are in the up positions; the acid pour valve is open; the manifold vent cylinders are retracted; low pressure air to the manifold vent cylinders is supplied to the cylinders, the master control relay is on; the head 1/head 2 switch 526 is in manual; and the manual/automatic switches 524 and 525 are in manual. The cycle stop/push button 522 is pressed; the reset switch 530 is closed; the manual/automatic switches 524 and 525 are moved to the automatic position; the cycle start switch 523 is closed; and the automatic cycle starts.

The head 1 stop gates comes up and the first battery enters the entrance gate area. The entrance eye causes a counter in the controller to count 1 and no action is taken. The head 2 exit eye causes a counter in the controller to count 1 as the battery travels past head 2. Stop gate 2 comes up after the battery has passed head 2. The first battery arrives at head 1 and it stops as it engages stop gate 1 and causes the head 1 eye to initiate a count of 1 which lets the controller know that the battery is in position for head 1. The second battery enters the station and the entrance eye causes a counter in the controller to count 2. The entrance conveyor stops and the battery travels on to head 2 eye which causes a counter in the conveyor to count 2 which causes timer TD1 to start. Timer TD1 times out which means that the batteries are in position to be filled. Heads 1 and 2 start to come down. Timer TD2 starts. When TD2 times out, heads 1 and 2 are down on the batteries. The acid pour valve 65 is closed and the main conveyor is stopped. Acid pour valve timer TD3 is started and the diaphragms of the leveling chambers start going down and release proximity switches as they start downward. Each leveling chamber has an up proximity switch and a down proximity switch and when they start down they release the up switches. The manifold vent cylinders extend if those selector switches are turned on. The diaphragms of the leveling chambers get fully down and the leveling chambers close the down proximity switches. The acid pour valve opens. This starts timer TD4 to allow a small amount of time before diaphragms of the leveling chambers start up. Timer TD4 times out and the diaphragms of the leveling chambers start up. When the diaphragms of the leveling chambers are up the up proximity switches close. That completes the fill cycle. The manifold vent cylinders are retracted and the two psi air is turned off and both of heads 1 and 2 go up. The main conveyor starts and timer TD5 starts. When timer TD5 times out, the heads 1 and 2 are fully in the up positions. The stop gates move down and the two batteries start exiting the station and the entrance conveyor starts up. Once both batteries pass head 1 exit eye it actuates a counter in the controller which counts 2. The stop gate 1 comes up and head 2 exit eye counts 1 and another pair of unfilled batteries enter the apparatus and the cycle repeats.

As indicated above, there are two (up and down) proximity switches for each head. These switches tell the controller what location the leveling chambers are at. In the automatic cycle, the switches will allow the next step to take place. At the start of an automatic cycle, the leveling chambers are up and the up switches are closed. The batteries enter the machine and the heads lower to meet the top of the battery case. After the heads get down, the leveling chambers start down. The up switches release and cause no action. The filling process takes place and the leveling chambers get down and close the down switches. The cycle will not continue until the down switches are closed. When the filling is complete, the leveling chambers start up, releasing the down switches which cause no action. The heads will not lift up until the up switches are closed. This insures that the leveling was completed correctly. When the up switches are closed, the heads lift up and the cycle continues.

We claim:

1. An apparatus for filling a battery with acid wherein the battery is of the type having an upper end with at least one opening leading to a cell comprising:

a battery support for supporting a battery at a fill position with its upper end facing upward, a head with a lower portion extending downward, a source for supplying acid, a fill conduit coupled from said source to said head, a tube connected to said head, head support means for supporting said head for movement between an upper position and a lower position such that said lower portion of said head and said tube may be coupled to the opening of a battery when said head is at said lower position, a pressure reducing means coupled to said tube for removing excess acid from the battery by way of the opening of the battery, valve means for controlling the flow of acid from said source into said fill conduit, for applying acid into the battery by way of said head and the opening of the battery, said head comprises an upper end with a lower portion extending downward to a lower end with a head opening extending through said head from said upper end to said lower end, said fill conduit being coupled to said head opening between said upper end and said lower end, said tube extending through said head opening from said upper end to a position below said lower end of said head, and a space located between the outside of said tube and the inside wall of said head opening such that acid can flow from said fill conduit through said lower end of said head by way of said space.

2. The apparatus of claim 1, comprising:

control means for controlling:

a) said support means for causing said head to move to said lower position to couple said lower portion of said head and said tube to the opening of the battery, b) said valve means to allow acid to flow from said source to said head to fill the cell of the battery with acid, c) said pressure reducing means to remove excess acid from the cell of the battery by way of the opening of the battery and said tube, and d) said head support means for causing said head to move to said upper position after the cell of the battery is filled with acid to remove said head from the opening of the battery.

3. The apparatus of claim 1 for use with a battery of the type having a manifold comprising a wall having an upper portion and side walls defining a chamber above the opening of the battery with an upper opening extending through the upper portion of the wall in alignment with the opening of the battery and a side opening extending through the side wall of the manifold, comprising:

means for applying low pressure air into said chamber by way of said side opening when acid is applied into said battery.

4. The apparatus of claim 1, wherein:

said source comprises:
 a tank for holding acid,
 said tank having a lower end and an upper end,
 a circulating conduit having an inlet coupled to said lower end of said tank and an outlet coupled to said tank,
 a pump coupled to said circulating conduit for pumping acid from lower end of said tank into said circulating conduit by way of said inlet,
 said valve means being coupled to said circulating conduct between said pump and said outlet of said circulating conduit,
 said battery fill conduit being coupled to said circulating conduit between said pump and said valve means for flowing acid from said circulating conduit to said head opening when said pump is operating and said valve means is closed.

5. The apparatus of claim 4, comprising control means for controlling operation of said pump and said valve means whereby acid can flow from said circulating conduit into said fill conduit when said pump is operating and said valve means is closed and circulates from said inlet of said circulating conduit through said outlet of said circulating conduit when said pump is operating and said valve means is open.

6. The apparatus of claim 4, comprising:
 a vent tube having one end coupled from said head opening between said fill conduit and said lower end of said head and an opposite end coupled to said tank.

7. The apparatus of claim 4 wherein said pressure reducing means comprises:
 a hollow cylinder having an annular side wall and first and second end walls,
 a flexible bladder located in said cylinder and coupled to said annular side wall,
 said tube being coupled to said second end wall in communication with the interior of said cylinder between said bladder and said second end wall, and
 a rod extending through said first end wall and coupled to said bladder for moving said bladder away from and toward said second end wall for drawing acid into said tube and for discharging acid from said tube respectively.

8. The apparatus of claim 7 for use with a battery of the type having a manifold comprising a wall having an upper portion and side walls defining a chamber above the opening of the battery with an upper opening extending through the upper portion of the wall in alignment with the opening of the battery and a side opening extending through the side wall of the manifold, comprising:

means for apply low pressure air into said manifold by way of said side opening when acid is applied into said battery.

9. The apparatus of claim 1 wherein said pressure reducing means comprises:
 a hollow cylinder having an annular side wall and first and second end walls,
 a flexible bladder located in said cylinder and coupled to said annular side wall,
 said tube being coupled to said second end wall in communication with the interior of said cylinder between said bladder and said second end wall, and
 a rod extending through said first end wall and coupled to said bladder for moving said bladder away from and toward said second end wall for drawing acid into said tube and for discharging acid from said tube respectively.

10. An apparatus for filling a battery with acid wherein the battery is of the type having an upper end with at least one opening leading to a cell comprising:
 a battery support for supporting a battery at a fill position with its upper end facing upward,
 a head with a lower portion extending downward,
 a source for supplying acid,
 a fill conduit coupled from said source to said head,
 a tube connected to said head,
 head support means for supporting said head for movement between an upper position and lower position such that said lower portion of said head and said tube may be coupled to the opening of a battery when said head is at said lower position,
 a pressure reducing means coupled to said tube for removing excess acid from the battery by way of the opening of the battery, said pressure reducing means comprising:
 a hollow cylinder having an annular side wall and first and second end walls,
 a flexible bladder located in said cylinder and coupled to said annular side wall,
 said tube being coupled to said second end wall in communication with the interior of said cylinder between said bladder and said second end wall, and
 a rod extending through said first end wall and coupled to said bladder for moving said bladder away from and toward said second end wall for drawing acid into said tube and for discharging acid from said tube respectively and
 valve means for controlling the flow of acid from said source into said fill conduit, for applying acid into the battery by way of said head and the opening of the battery.

11. An apparatus for filling a battery with acid wherein the battery is of the type having an upper end with a plurality of openings leading to a plurality of cells respectfully, comprising:
 a battery support for supporting a battery at a fill position with its upper end facing upward,
 a plurality of heads each with a lower portion extending downward,
 a source for supplying acid,
 a plurality of fill conduits coupled from said source to said plurality of heads respectively,
 a plurality of pressure reducing means,
 a plurality of tubes each having a first end coupled to one of each of said heads and an opposite end coupled to one of each of said pressure reducing means, head support means for supporting said plurality of heads for movement between upper positions and lower positions such that said plurality of heads may be coupled to the plurality of openings of the battery respectively when said heads are located in said lower positions, valve means for controlling the flow of acid from said source to said fill conduits for applying acid into the battery by way of said heads and the openings of the battery, and a plurality of pressure reducing means coupled to said plurality of tubes respectively for removing excess acid from the battery by way of the openings of the battery, each of said heads comprising:
- an upper end with a lower portion extending downward to a lower end with a head opening extending through said head from said upper end to said lower end,
- its said fill conduit being coupled to its said head opening between said upper end and said lower end of said head,
- its said tube extending through said head opening from said upper end to a position below said lower end of said head, and
- a space located between the outside of its said tube and the inside wall of said head opening such that acid can flow from its said fill conduit through said lower end of said head by way of said space.

12. The apparatus of claim 11, comprising:
control means for controlling:
a) said head support means for causing said heads to move from said upper positions to said lower position to couple one of each of said heads to one of each of the openings of the battery,
b) said valve means to allow acid to flow from said source to each of said heads to fill the cells of the battery with acid,
c) said pressure reducing means to remove excess acid from the cells of the battery by way of the openings of the battery and said tubes, and
d) said head support means for causing said heads to move to said upper positions after the cells of the battery are filled with acid to remove said heads from the openings of the battery.

13. The apparatus of claim 12, comprising:
a conveyor for supporting and moving a battery in a given direction to said fill position below said plurality of heads when said heads are in said upper positions prior to the operation of (a) and for moving a battery in said given away from said fill position after the operation of (d).

14. The apparatus of claim 11 for use with a battery of the type having a manifold comprising a wall having an upper portion and side walls defining a chamber above the openings of the battery with upper openings extending through the upper portion of the wall in alignment with the openings of the battery and a side opening extending through the side wall of the manifold, comprising:
means for apply low pressure air into said chamber by way of said side opening when acid is applied into said battery.

15. The apparatus of claim 11, wherein:
said source comprises:
a tank for holding acid,
said tank having a lower end and an upper end,
a circulating conduit having an inlet coupled to said lower end of said tank and an outlet coupled to said tank,
a pump coupled to said circulating conduit for pumping acid from lower end of said tank into said circulating conduit by way of said inlet,
said valve means being coupled to said circulating conduct between said pump and said outlet of said circulating conduit,
said battery fill conduits being coupled to said circulating conduit between said pump and said valve means for flowing acid from said circulating conduit to said head openings when said pump is operating and said valve means is closed.

16. The apparatus of claim 15 comprising control means for controlling operation of said pump and said valve means whereby acid can flow from said circulating conduit into said fill conduits when said pump is operating and said valve means is closed and circulates from said inlet of said circulating conduit through said outlet of said circulating conduit when said pump is operating and said valve means is open.

17. The apparatus of claim 15, comprising:
a plurality of vent tubes one of each of which is coupled to one of said head openings between its said fill conduit and its said lower end and an opposite end coupled to said tank.

18. The apparatus of claim 15, wherein:
each of said pressure reducing means comprises:
a hollow cylinder having an annular side wall and first and second end walls,
a flexible bladder located in said cylinder and coupled to said annular side wall,
its said tube being coupled to said second end wall in communication with the interior of said cylinder between said bladder and said second end wall, and
a rod extending through said first end wall and coupled to said bladder for moving said bladder away from and toward said second end wall for drawing acid into its said tube and for discharging acid from its said tube respectively.

19. The apparatus of claim 18 for use with a battery of the type having a manifold comprising a wall having an upper portion and side walls defining a chamber above the openings of the battery with upper openings extending through the upper portion of the wall in alignment with the openings of the battery and a side opening extending through the side wall of the manifold, comprising:
means for apply low pressure air into said manifold by way of said side opening when acid is applied into said battery.

20. The apparatus of claim 11, wherein:
each of said pressure reducing means comprises,
a hollow cylinder having an annular side wall and first and second end walls,
a flexible bladder located in said cylinder and coupled to said annular side wall,
its said tube being coupled to said second end wall in communication with the interior of said cylinder between said bladder and said second end wall, and
a rod extending through said first end wall and coupled to said bladder for moving said bladder away from and toward said second end wall for drawing acid into its said tube and for discharging acid from its said tube respectively.

21. An apparatus for filling a battery with acid wherein the battery is of the type having an upper end with a plurality of openings leading to a plurality of cells respectfully, comprising:
a battery support for supporting a battery at a fill position with its upper end facing upward, a plurality of heads each with a lower portion extending downward, a source for supplying acid, a plurality of fill conduits coupled from said source to said plurality of heads respectively, a plurality of pressure reducing means, a plurality of tubes each having a first end coupled to one of each of said heads and an opposite end coupled to one of each of said pressure reducing means, head support means for supporting said plurality of heads for movement between upper positions and lower positions such that said plurality of heads may be coupled to the plurality of openings of the battery respectively when said heads are located in said lower positions, valve means for controlling the flow of acid from said source to said fill conduits for applying acid into the battery by way of said heads and the openings of the battery, and a plurality of pressure reducing means coupled to said plurality of tubes respectively for removing excess acid from the battery by way of the openings of the battery, each of said pressure reducing means comprises:

a hollow cylinder having an annular side wall and first and second end walls, a flexible bladder located in said cylinder and coupled to said annular side wall, its said tube being coupled to said second end wall in communication with the interior of said cylinder between said bladder and said second end wall, and a rod extending through said first end wall and coupled to said bladder for moving said bladder away from and toward said second end wall for drawing acid into its said tube and for discharging acid from its said tube respectively.

22. An apparatus for filling a battery with acid wherein the battery is of the type having an upper end with at least one opening leading to a cell, and a manifold comprising a wall having an upper portion and side walls defining a chamber above the opening of the battery with an upper opening extending through the upper portion of the wall in alignment with the opening of the battery and a side opening extending through the side wall of the manifold, comprising:

a battery support for supporting a battery at a fill position with its upper end facing upward, a head with a lower portion extending downward, a source for supplying acid, a fill conduit coupled from said source to said head, a tube connected to said head, head support means for supporting said head for movement between an upper position and a lower position such that said lower portion of said head and said tube may be coupled to the opening of a battery when said head is at said lower position, a pressure reducing means coupled to said tube for removing excess acid from the battery by way of the opening of the battery, valve means for controlling the flow of acid from said source into said fill conduit, for applying acid into the battery by way of said head and the opening of the battery, and means for applying low pressure air into said chamber by way of said side opening when acid is applied into the battery.

23. An apparatus for filling a battery with acid wherein the battery is of the type having an upper end with a plurality of openings leading to a plurality of cells respectively, and a manifold comprising a wall having an upper portion and side walls defining a chamber above the openings of the battery with upper openings extending through the upper portion of the wall in alignment with the openings of the battery and a side opening extending through the side wall of the manifold, comprising:

a battery support for supporting a battery at a fill position with its upper end facing upward, a plurality of heads each with a lower portion extending downward, a source for supplying acid, a plurality of fill conduits coupled from said source to said plurality of heads respectively, a plurality of pressure reducing means, a plurality of tubes each having a first end coupled to one of each of said heads and an opposite end coupled to one of each of said pressure reducing means, head support means for supporting said plurality of heads for movement between upper positions and lower positions such that said plurality of heads may be coupled to the plurality of openings of the battery respectively when said heads are located in said lower positions, valve means for controlling the flow of acid from said source to said fill conduits for applying acid into the battery by way of said heads and the openings of the battery, a plurality of pressure reducing means coupled to said tubes for removing excess acid from the battery by way of the openings of the battery, and means for applying low pressure air into said chamber by way of said side opening when acid is applied into said battery.

* * * * *